United States Patent
Landén et al.

(10) Patent No.: US 6,592,142 B2
(45) Date of Patent: Jul. 15, 2003

(54) ASSEMBLY MODULE AND METHOD FOR ASSEMBLY THEREOF

(75) Inventors: Joakim Landén, Göteborg (SE); Luis Gras Tous, Madrid (SE)

(73) Assignee: Volvo Personvagnor AB, Göteborg (SE)

(*) Notice: Subject to any disclaimer, the term of this patent is extended or adjusted under 35 U.S.C. 154(b) by 0 days.

(21) Appl. No.: 09/682,047

(22) Filed: Jul. 13, 2001

(65) Prior Publication Data

US 2002/0027343 A1 Mar. 7, 2002

(51) Int. Cl.⁷ .............................................. B60R 21/16
(52) U.S. Cl. ...................................... 280/728.2; 280/731
(58) Field of Search ............................. 280/731, 728.2, 280/728.3; 74/552; 200/61.54, 61.57

(56) References Cited

U.S. PATENT DOCUMENTS

| | | | | |
|---|---|---|---|---|
| 4,325,568 A | * | 4/1982 | Clark et al. ................. | 280/731 |
| 4,590,340 A | * | 5/1986 | Koike et al. ............. | 200/61.54 |
| 4,804,857 A | * | 2/1989 | Hayashi et al. ............. | 280/731 |
| 5,085,461 A | | 2/1992 | Shibata | |
| 5,333,897 A | * | 8/1994 | Landis et al. ................ | 280/731 |
| 5,380,037 A | * | 1/1995 | Worrell et al. ............... | 280/731 |
| 5,403,981 A | * | 4/1995 | Chen et al. ............. | 200/61.54 |
| 5,508,482 A | * | 4/1996 | Martin et al. ............ | 200/61.54 |
| 5,542,694 A | | 8/1996 | Davis | |
| 5,678,849 A | | 10/1997 | Davis | |
| 5,947,509 A | * | 9/1999 | Ricks et al. ................. | 280/731 |
| 6,126,193 A | * | 10/2000 | Hosoi et al. ................. | 280/731 |
| 6,173,988 B1 | * | 1/2001 | Igawa ...................... | 280/728.2 |
| 6,183,005 B1 | * | 2/2001 | Nishijima et al. .......... | 280/731 |
| 6,344,621 B1 | * | 2/2002 | Shiratori et al. ......... | 200/61.54 |
| 6,426,473 B1 | * | 7/2002 | Derrick et al. ........... | 280/728.2 |

FOREIGN PATENT DOCUMENTS

| | | | |
|---|---|---|---|
| DE | 19914653 C1 | 7/2000 | |
| EP | 0488618 A1 * | 6/1992 | ............ B60R/21/20 |
| JP | 59164265 A * | 9/1984 | ............ B62D/1/04 |
| JP | 2171381 A * | 7/1990 | ............ B62D/1/04 |
| JP | 680083 A * | 3/1994 | ............ B62D/1/04 |
| JP | 6312664 A * | 11/1994 | ............ B62D/1/04 |

* cited by examiner

Primary Examiner—Paul N. Dickson
Assistant Examiner—Joselyn Y. Sliteris
(74) Attorney, Agent, or Firm—Howrey Simon Arnold & White LLP

(57) ABSTRACT

The invention relates to an assembly module intended for a steering wheel in a vehicle comprising a console intended to be fitted in a steering wheel hub of the steering wheel. The console is provided with a number of notches for fastening with an airbag module provided with a corresponding number of fastening elements. One or more operating control modules are fastened to the console in connection with the airbag module, and are detachable joined to the airbag module. The invention also relates to a method for assembling the said modules.

13 Claims, 4 Drawing Sheets

ASSEMBLY MODULE AND METHOD FOR ASSEMBLY THEREOF

CROSS REFERENCE TO RELATED APPLICATIONS

The present application claims priority to Swedish Application No. 0002662-5, filed Jul. 14, 2000.

BACKGROUND OF INVENTION

1. Technical Field

The present invention relates to an assembly module having an airbag module and at least two modules for electrical operating controls, and a method for the assembly thereof.

2. Background Information

Modules for the assembly of crash cushions, commonly known as airbag modules, are already widely known, as disclosed in U.S. Pat. Nos. 5,755,458 or 5,149,127, for example. This type of module generally comprises a crash cushion fitted in a console, which is used in connection with the assembly of horn switches between the console and the steering wheel hub. One problem with such modules is that the electrical connections for the airbag module tend to protrude up through the steering wheel hub making them difficult to connect. There is also the risk of the wiring becoming trapped and damaged when assembling and dismantling the airbag module.

Another problem that occurs with this type of module is in obtaining the correct fit between steering wheel, airbag module and switch arrays for operating peripheral equipment. The switch arrays themselves may also be designed as modules, typically fitted directly to the steering wheel. This results in a poor fit between the modules and the airbag module. Further, the wiring for the modules is difficult to assemble and risks being damaged or trapped when assembling the airbag module. Since non-centered parts are unattractive, a customer may take a negative view of even very slight deviations. A precise fit is therefore desirable.

A further problem with the above assembly solution is that typically only the airbag module can be used for operation of the horn. In a stressful situation the driver must remember that the switch arrays do not have this function. Since the switch arrays generally extend from the steering wheel rim a distance onto the steering wheel spokes, the driver must take one hand entirely or partially off the steering wheel in order to be able to exert pressure on the airbag module.

SUMMARY OF INVENTION

The present invention provides an assembly module, that facilitates assembly and dismantling of the airbag module and modules for various operating controls, as well as simplifies the fitting between the various modules and between the assembly module and the steering wheel hub. This is achieved by an assembly module having a console that fits in a steering wheel hub of a steering wheel. The console may be provided with one or more notches for fastening an airbag module having a corresponding number of fastening elements. The console may also have fastening devices for one or more modules for electrical operating controls. These modules for operating controls may be either fastened to the console in connection with the airbag module, or detachably joined to the airbag module, or both. The airbag module and the modules for operating controls may have interacting first guides.

Normally, one operating control module, such as the car stereo system, telephone and navigation equipment, is fitted on each side of the airbag module. However, it is also possible to fit two such modules on each side, or, alternatively, one on each side and one at the bottom edge of the airbag module, depending on the design of the steering wheel hub and on the desired requirement for remote control of various electrical equipment from the steering wheel.

The modules for electrical operating controls are separately replaceable. Accordingly, it is easy to replace damaged modules or to upgrade one or more modules with further or new functions. The electrical connections can be connected either manually by joining the contacts together by hand when assembling, or automatically by automatically joining the module contacts together with corresponding connections when it is pushed into place when fitting to the console.

The airbag module is provided with a number of other guides that fit through the console for interacting with corresponding guides in the steering wheel hub. The guides also enable centering of the assembly module in relation to the steering wheel hub. The console is therefore flexibly mounted in the steering wheel hub in order to permit centering by the airbag module. The electrical connections of the airbag module can be made in the same way as the modules for operating controls.

The console also provides protection for electrical wiring in the steering wheel hub. By placing the console between the steering wheel hub and the airbag module and other modules, the risk of damaging wiring when fitting or removing the modules is minimized. If the connections for the modules are joined automatically by contacts that are pushed into one another, the length of the wiring can be minimized. In order to facilitate fitting and removal of the modules yet further, all fastenings may consist of snap fasteners.

One safety feature of the present invention is that all modules that are part of the assembly module are connected by way of the console to one or more horn switches in the steering wheel hub. As such, in a stressful situation the driver does not need to search for a particular button or press a specific part of the steering wheel such as the airbag module, since actuation of any part of the assembly module surface can activate the horn. It is important in this context to balance the force that is required for operation of the modules for other electrical equipment against the force required to activate the horn. Therefore, it must be possible to operate the switch arrays on any of the modules by applying significantly less pressure than is required for activation of the horn switch.

The invention also relates to a method for assembly of an assembly module as described above. The method comprises fastening a console in the steering wheel hub. At least two modules for operating controls provided with a number of guides are pushed into corresponding, interacting guide grooves in the console and fastened therein in conjunction with its fastening in the steering wheel hub. An airbag module provided with a number of further guides is pushed into corresponding, interacting guide grooves in the modules for operating controls, so that the modules are centered in relation to the airbag module, with the airbag module fastened in the console.

The modules for operating controls are fastened to the console after this has been fitted in the steering wheel hub, with the electrical connections automatically joined together. Alternatively, the operating controls modules may be fastened to the console before they are fitted in the steering wheel hub. This permits connection of the electrical connections before the console is fitted. In the same way the airbag module can be connected at the time of assembly by either automatic connection, or by manually joining together by way of an opening in the console that provides access to the leads situated behind. Preferably, the modules are replaceable without having to dismantle the console.

By means of the invention the operating control modules will be guided in correctly, and will provide a better fit and centering between the modules and the airbag module. Various parts of the assembly module may be dismantled in reverse order.

DETAILED DESCRIPTION

Figure 1:
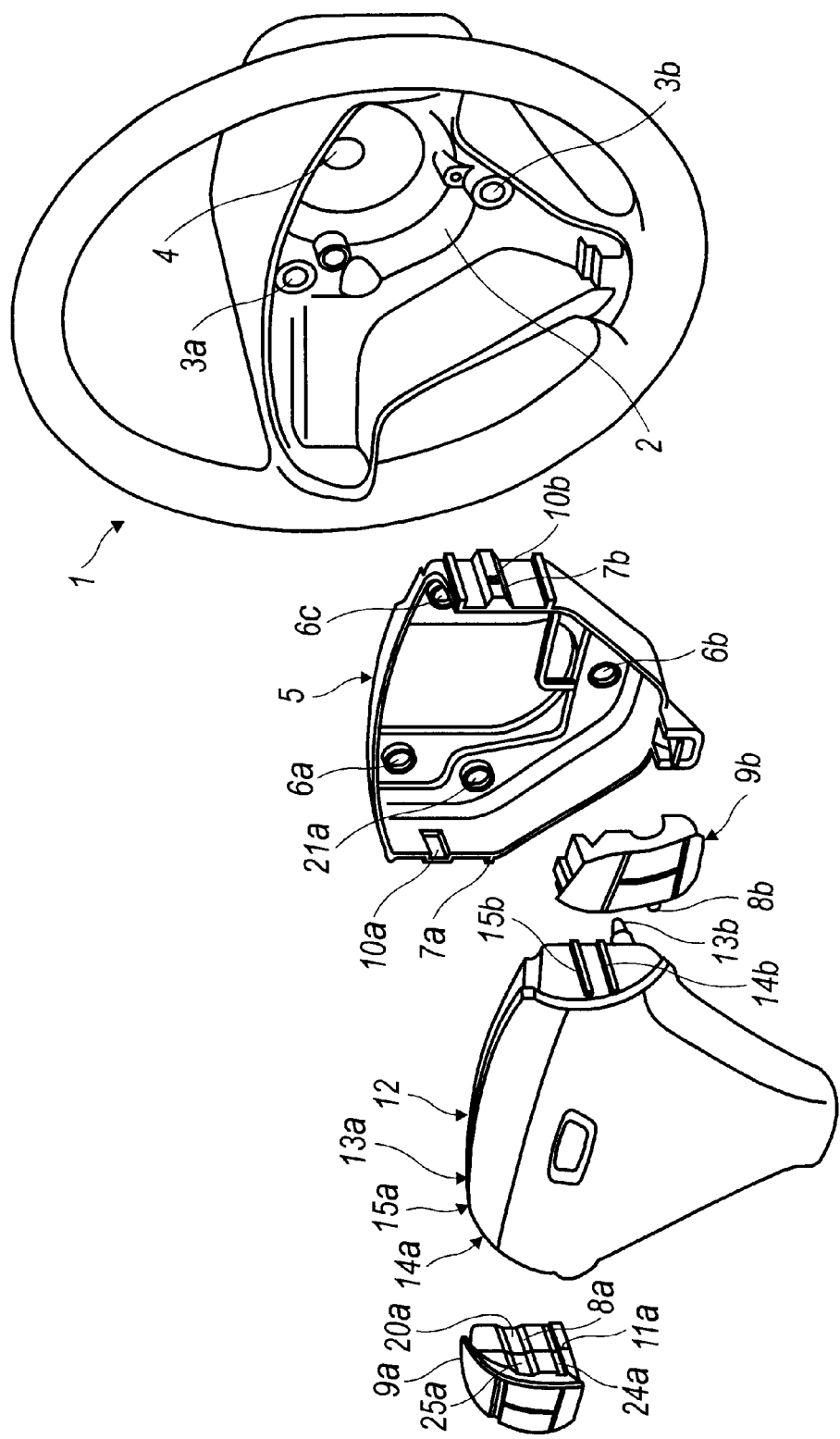
FIG. 1 illustrates an exploded perspective view of a steering wheel and the constituent parts of the assembly module.

FIG. 1 shows an embodiment according to the invention comprising a steering wheel 1 with a steering wheel hub 2, into which a number of modules 9a, 9b, 12 are to be fitted. The steering wheel hub 2 has a lead-through bushing 4 for electrical cables (not shown) for the modules 9a, 9b, 12, and a number of fastening points 3a, 3b, 3c (fastening point 3c is obscured in FIG. 1) for a console 5. The console 5 comprises an end surface facing the steering wheel hub and provided with a number of notches 6a, 6b, 6c, and having a wall standing essentially at right angles to the end surface around its periphery. The notches 6a, 6b, 6c interact with a corresponding number of fastening elements (not shown) for fitting the console 5 to the fastening points 3a, 3b, 3c. The fastening elements that are used for fitting the console 5 in the steering wheel hub 2 may also constitute horn switches. The horn may be activated by pressing on the console 5, or on any of its constituent modules. After fitting the modules, the electrical wiring will lie protected between the steering wheel hub 2 and the console 5.

Electrical connection of all constituent modules 9a, 9b, 12 can be made either immediately before each module is fitted by manually joining the electrical contacts together, or automatically when fitting by pushing interacting contacts into one another when each module is pushed into place. In the latter case contacts can preferably be fitted to the console 5 in connection with the positions occupied by the modules. The console 5 can also then be connected to the wiring manually through a notch in the end surface 22a of the console 5 (FIG. 2) or automatically when assembling by means of contacts in the steering wheel hub 2.

The console 5 has a peripheral wall 22b essentially at right angles to its end surface 22a. Along the outer sides of a pair of opposing sections of the wall 22b, the console 5 has first guide grooves 7a, 7b for interaction with corresponding first guides 8a, 8b on the sides of a pair of modules 9a, 9b for operating controls facing the console. These modules 9a, 9b are positioned and pushed into place with the aid of the first guide grooves 7a, 7b, guides 8a, 8b, and are locked in position by means of fastening elements 20a, 20b (FIG. 2) in a pair of notches 10a, 10b in the wall 22b of the console 5. In order to achieve correct positioning, the modules 9a, 9b are provided with at least one stop 11a that comes into contact with the edge of the wall 22b of the console 5 when the fastening elements 20a, 20b engage in the notches 10a, 10b of the console 5. The modules 9a, 9b can be fitted to the console 5 before or after they are fitted to the steering wheel hub 2. Different ways of connecting the electrical connections (not shown) of the modules 9a, 9b have been described above.

In addition to the aforementioned fastening elements, the modules can also be held in place by further interacting guides and guide grooves of known design, such as opposing U-shaped grooves on the console and tongues on the modules matching the former. The aforementioned fastening elements preferably comprise snap fasteners or some other type of quick coupler.

Figure 2:
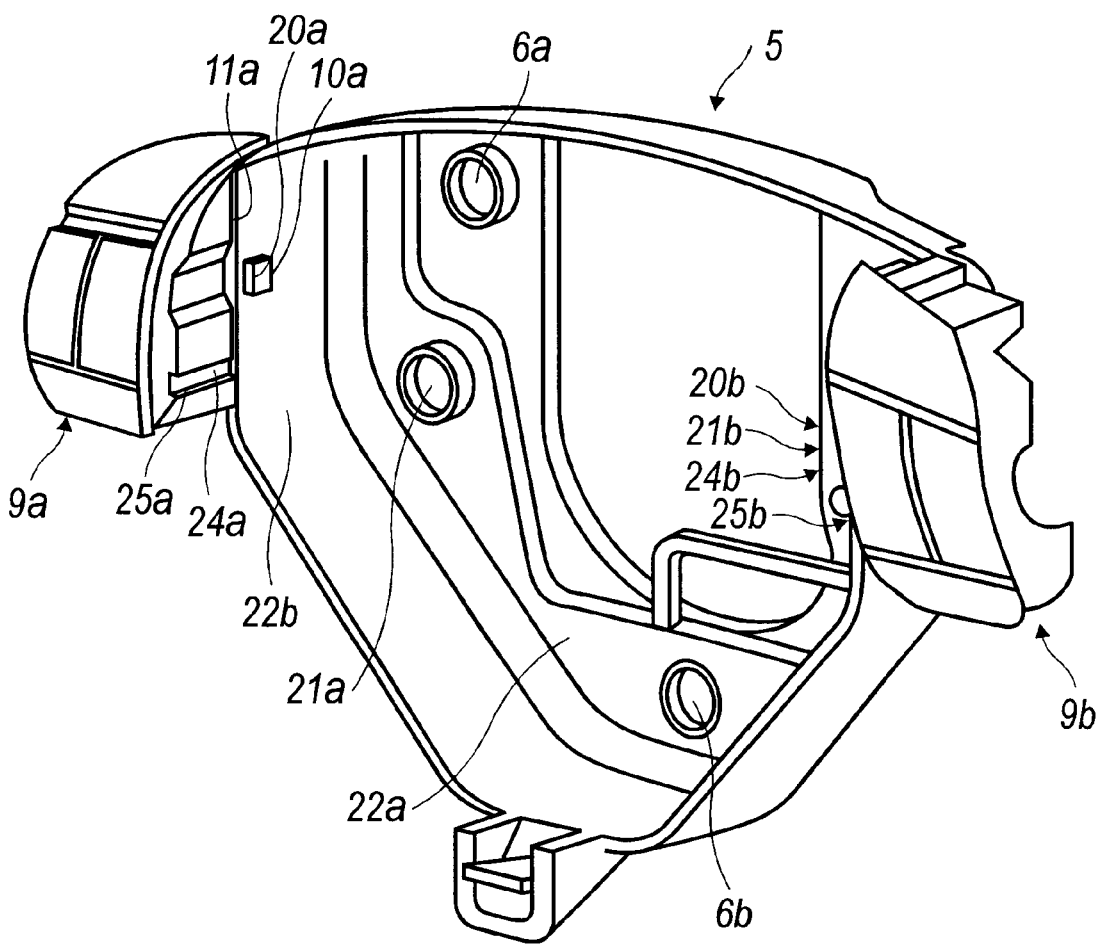
FIG. 2 illustrates perspective view of a console with modules for operating controls fitted thereon.

As will be seen from FIG. 2, both the console 5 and the modules 9a, 9b for operating controls are additionally provided with second guide grooves and guides. The console 5 is provided with guides in the form of further notches 21a, 21b in its end surface 22a facing the steering wheel hub 2. The modules 9a, 9b have second guide grooves 24a, 24b; 25a, 25b in their sides facing the console 5. The second guide grooves 24a, 24b, 25a, 25b are separate from the first guides 8a, 8b that interact with the console 5 in the assembly direction of the modules.

Figure 3:
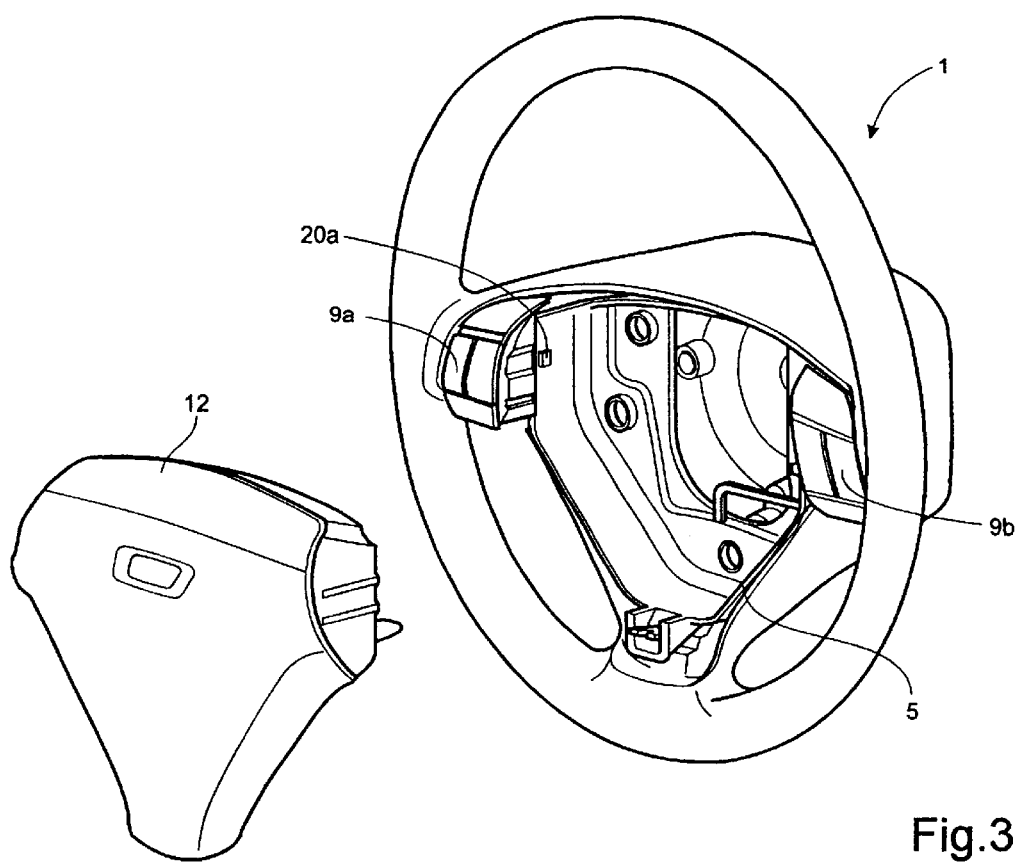
FIG. 3 illustrates an exploded perspective view of a steering wheel and an airbag module for fitting in the console with operating control modules fitted onto the console.
Figure 4:
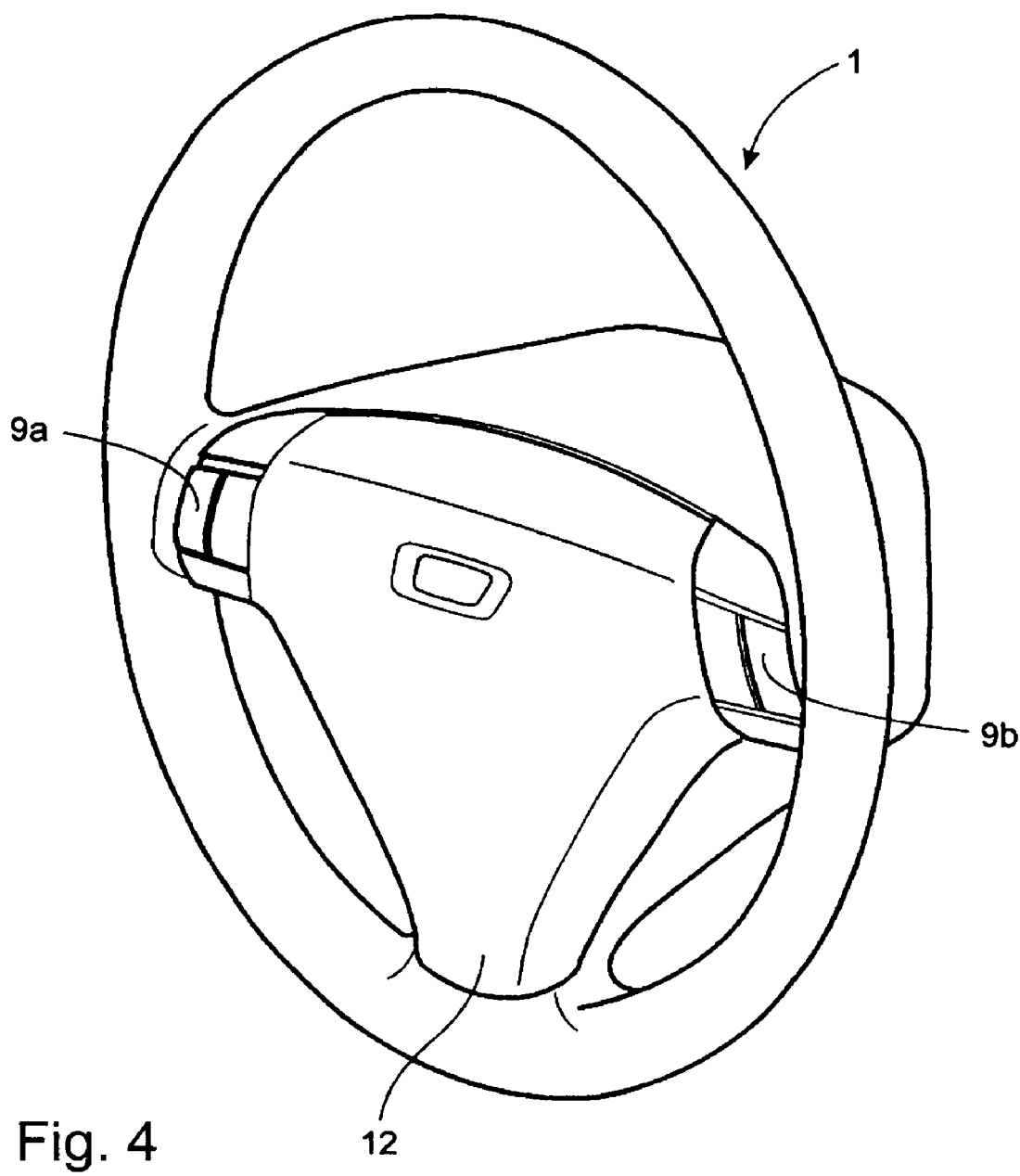
FIG. 4 illustrates perspective view of a steering wheel with an assembled module according to the invention.

An airbag module 12 is provided with guides 13a, 13b, 14a, 14b, 15a and 15b, respectively, which interact with corresponding notches 21a, 21b in the console 5 and guide grooves 24a, 24b, 25a, 25b, respectively, on the modules 9a, 9b for operating controls. FIG. 3 shows a steering wheel 1 with the console 5 and the modules 9a, 9b for operating controls fitted and ready to receive the airbag module 12. When fitting the airbag module 12, the guides 14a, 14b, 15a, 15b (FIG. 1) engage in the guide grooves 24a, 24b, 25a, 25b on the modules 9a, 9b for operating controls. The airbag module 12 is guided in and centered in relation to both of the modules 9a, 9b. When the airbag module 12 has been pushed in a certain extent, a pair of guides 13a, 13b on the end surface of the module facing the hub will come into contact with their corresponding notches 21a, 21b in the end surface 22a of the console 5. The airbag module 12 will then be guided in and centered in relation to the console 5 and the steering wheel hub 2. The guides 13a, 13b of the airbag module also constitute fastening devices, which preferably fasten the airbag module 12 to the console 5 by snap fasteners. In this way, both the position of the assembly module 5, 9a, 9b, 12 relative to the steering wheel hub 2, and the reciprocal fit in relation to the airbag module 12 and the modules 9a, 9b for operating controls is ensured. A steering wheel with the complete assembly module in place is shown in FIG. 4.

The embodiment according to FIG. 1 shows an assembly module with two separate modules for operating controls. Depending on the design of the steering wheel, such as the number of spokes and the number of functions required, it is possible to produce a solution with multiple such modules. It is feasible, for example, to fit four modules in pairs on a steering wheel according to FIG. 1, or to locate one module on each steering wheel spoke of a steering wheel with two or more spokes. As such, all modules for operating controls are fitted around the periphery of the console. The centering and fitting of the modules may occur in relation to the steering wheel being guided in by interacting guides and guide grooves when fitting the airbag module.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. An assembly module intended for a steering wheel in a vehicle comprising: a console for fining in a steering wheel hub of the steering wheel; one or more notches positioned on the console; and an airbag module comprising one or more fastening elements corresponding to the one or more notches;

wherein the one or more notches fasten the airbag module to the console by means of the fastening elements;

wherein a number of modules for operating controls are fastened to the console in connection with said airbag module, and are detachably joined to the airbag module;

wherein guide grooves interact with fastening elements on at least two modules for operating controls; and wherein the airbag module and the operating control modules further comprise interacting guides and guide grooves.

2. The assembly module according to claim 1 wherein the console comprises an end surface facing the steering wheel hub and a wall standing essentially at right angles to the end surface around its periphery.

3. The assembly module according to claim 2 wherein the modules for operating controls are fastened to the outer side of the wall of the console.

4. The assembly module according to claim 2 wherein the airbag module is fastened in the end surface of the console.

5. The assembly module according to claim 1 wherein the airbag module is fastened between the modules for operating controls.

6. The assembly module according to claim 1 wherein the modules for operating controls are separately replaceable.

7. The assembly module according to claim 1 wherein the operating controls comprise switch arrays for operating electrical equipment situated in the vehicle.

8. The assembly module according to claim 1 wherein the console constitutes a protection for electrical wiring in the steering wheel hub.

9. The assembly module according to claim 1 wherein all fastening devices in the assembly module comprise snap fasteners.

10. A method for assembling an assembly module having a steering wheel, steering wheel hub, console, one or more operating control modules and an airbag module, comprising the steps of:

fastening the console in the steering wheel hub;

pushing one or more operating control modules in the console;

wherein the operating control modules are provided with one or more guides and the console is provided with one or more corresponding, interacting guide grooves for fastening therein in conjunction with fastening of the console in the steering wheel hub; and pushing the airbag module in the modules for operating controls;

the airbag module having a number of further guides and the operating control modules having corresponding, interacting guide grooves for pushing together so that the airbag module is centered in relation to the operating control modules, the airbag module being fastened in the console.

11. The method for assembling an assembly module according to claim 10 wherein the modules are fastened to the console before fitting in the steering wheel hub.

12. The method for assembling an assembly module according to claim 10 wherein the modules are fastened to the console after fitting in the steering wheel hub.

13. The method for assembling an assembly module according to claim 10 wherein all fastenings comprise snap fasteners.

* * * * *